United States Patent
Schlueter et al.

(10) Patent No.: US 12,368,289 B2
(45) Date of Patent: Jul. 22, 2025

(54) CABLE SCREW-CONNECTION SYSTEM

(71) Applicant: Phoenix Contact GmbH & Co. KG, Blomberg (DE)

(72) Inventors: Tobias Schlueter, Schieder-Schwalenberg (DE); Antje Skowranek, Horn-Bad Meinberg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 358 days.

(21) Appl. No.: 17/777,625

(22) PCT Filed: Nov. 16, 2020

(86) PCT No.: PCT/EP2020/082259
§ 371 (c)(1),
(2) Date: Aug. 26, 2022

(87) PCT Pub. No.: WO2021/099266
PCT Pub. Date: May 27, 2021

(65) Prior Publication Data
US 2022/0399704 A1    Dec. 15, 2022

(30) Foreign Application Priority Data
Nov. 20, 2019 (BE) .................................. 2019/5803

(51) Int. Cl.
*H02G 3/22* (2006.01)
*H02G 3/06* (2006.01)

(52) U.S. Cl.
CPC ............. *H02G 3/0675* (2013.01); *H02G 3/22* (2013.01)

(58) Field of Classification Search
CPC .......... H02G 3/0675; H02G 3/22; H02G 3/06; H02G 3/24; H02G 3/26; H02G 3/28;
(Continued)

(56) References Cited

U.S. PATENT DOCUMENTS 4,767,135 A * 8/1988 Holzmann ........... H02G 3/0658
285/379
5,321,205 A     6/1994 Bawa et al.
(Continued)

FOREIGN PATENT DOCUMENTS

DE    102010007093 A1    8/2011
EP       0232831 A2      8/1987
(Continued)

*Primary Examiner* — Angel R Estrada
(74) *Attorney, Agent, or Firm* — LEYDIG, VOIT & MAYER, LTD.

(57) ABSTRACT

A cable gland system for arrangement on a housing wall includes: a guide element with an opening for receiving a cable, a first support surface for supporting on a first side of the housing wall and a first end region, and an opposite second end region, at least one external thread being arranged at least on a periphery of the first end region; and a fastening element with a second support surface for supporting on a second side of the housing wall, and an internal thread on an inner surface, the internal thread engaging with the external thread on the guide element in a screwed-on state. At least one contact surface with a contact structure respectively arranged on the periphery of the guide element, adjacent to the external thread and to the inner surface of the fastening element.

16 Claims, 4 Drawing Sheets

(58) Field of Classification Search
CPC .......... H02G 3/286; H02G 3/288; H01R 4/66; H01R 13/59
USPC ..... 174/653, 650, 666, 668, 72 C, 659, 656, 174/651, 652; 285/27, 390, 23, 322, 921, 285/154.1; 248/68.1, 49, 74.1, 74.2
See application file for complete search history.

(56) References Cited

U.S. PATENT DOCUMENTS

| | | | |
|---|---|---|---|
| 5,608,189 A | 3/1997 | Winterhoff et al. | |
| 6,350,955 B1* | 2/2002 | Daoud | H02G 15/04 285/322 |
| 6,488,317 B1* | 12/2002 | Daoud | H02G 3/0675 285/345 |
| 7,431,602 B2* | 10/2008 | Corona | H01R 13/5205 439/272 |
| 7,563,993 B2* | 7/2009 | Drotleff | H02G 15/007 174/653 |
| 9,431,815 B1* | 8/2016 | Findley | H02G 3/0641 |
| 9,450,328 B2* | 9/2016 | Lindkamp | H01R 13/502 |
| 10,199,766 B2 | 2/2019 | Smajda et al. | |
| 10,389,102 B2* | 8/2019 | Jackson | H02G 3/0666 |
| 11,411,378 B2* | 8/2022 | Schnieder | H02G 3/0675 |
| 2002/0192048 A1 | 12/2002 | Bushell et al. | |
| 2007/0175027 A1 | 8/2007 | Khemakhem et al. | |
| 2012/0292098 A1 | 11/2012 | Kinzl et al. | |
| 2015/0364854 A1 | 12/2015 | Lindkamp | |

FOREIGN PATENT DOCUMENTS

| | | |
|---|---|---|
| EP | 0655817 A1 | 5/1995 |
| EP | 1710886 A1 | 10/2006 |
| EP | 2650576 A1 | 10/2013 |
| JP | 59013023 U | 1/1984 |
| JP | 08326729 A | 12/1996 |
| JP | 11062938 A | 3/1999 |
| JP | 11236986 A | 8/1999 |
| JP | 2002239669 A | 8/2002 |
| JP | 3094683 U | 7/2003 |
| JP | 2006307965 A | 11/2006 |
| JP | 2019062729 A | 4/2019 |
| WO | WO 2013161532 A1 | 10/2013 |
| WO | WO 2014121783 A1 | 8/2014 |

* cited by examiner

CABLE SCREW-CONNECTION SYSTEM

CROSS-REFERENCE TO PRIOR APPLICATIONS

This application is a U.S. National Phase application under 35 U.S.C. § 371 of International Application No. PCT/EP2020/082259, filed on Nov. 16, 2020, and claims benefit to Belgian Patent Application No. BE2019/5803, filed on Nov. 20, 2019. The International Application was published in German on May 27, 2021 as WO/2021/099266 under PCT Article 21(2).

FIELD

The invention relates to a cable gland system for arrangement on a housing wall, to a guide element for a cable gland system, and to a fastening element for a cable gland system.

BACKGROUND

Cable gland systems can be used in, for example, the field of photovoltaics, where they serve, for example, to connect one or more solar modules to an inverter through a housing wall.

A guide element of the cable gland can be inserted with one end through an opening in the housing wall, and can be fixed in the housing wall between a first support surface on the guide element and a second support surface on a fastening element fastened to the guide element. An opening, in which a cable can be receivable or be received and/or through which a cable can be guided, extends in portions or completely through the cable gland system. Such cable gland systems usually simultaneously provide a strain relief for the screwed cable. For example, DE 10 2016 118 521 A1 describes a cable gland system.

In addition, the cable gland system can form a plug-in connector part in order to contact the cable with a mating plug-in connector part.

The fastening of the cable gland system in the opening of the housing wall usually takes place in that the guide element of the cable gland system has an external thread on the end guided through the opening, onto which an attachment element, such as for example a nut, is screwed after the end has been guided through the opening, for example into the interior of the housing, for example the housing of an inverter; wherein, by screwing-on the fastening element, the first support surface on the guide element is pulled against the housing wall, and on the housing wall is fastened to the fastening element between the first support surface and a second support surface.

From in-house practical experience, the applicant is aware of cable gland systems with fine threads. Particularly in poorly accessible mounting areas, a great deal of effort is required in order to fasten the cable gland systems in the housing wall, since the mounting tool must be reset several times. The seating of the cable gland system can also become loose due to jolts and vibrations of the housing, and the fixed connection of the cable gland system to the housing wall can thereby come loose. In addition, known cable gland systems are often cost-intensive to manufacture due to their complex structure.

SUMMARY

In an embodiment, the present invention provides a cable gland system for arrangement on a housing wall, comprising: a guide element with an opening configured to receive a cable, a first support surface configured to support on a first side of the housing wall and a first end region, and an opposite second end region, at least one external thread being arranged at least on a periphery of the first end region; and a fastening element with a second support surface configured to support on a second side of the housing wall, and an internal thread on an inner surface, the internal thread being configured to engage with the external thread on the guide element in a screwed-on state, wherein at least one contact surface with a contact structure is respectively arranged on the periphery of the guide element, adjacent to the external thread and to the inner surface of the fastening element, and wherein the contact surfaces are configured to be in mechanical contact with one another in the screwed-on state.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
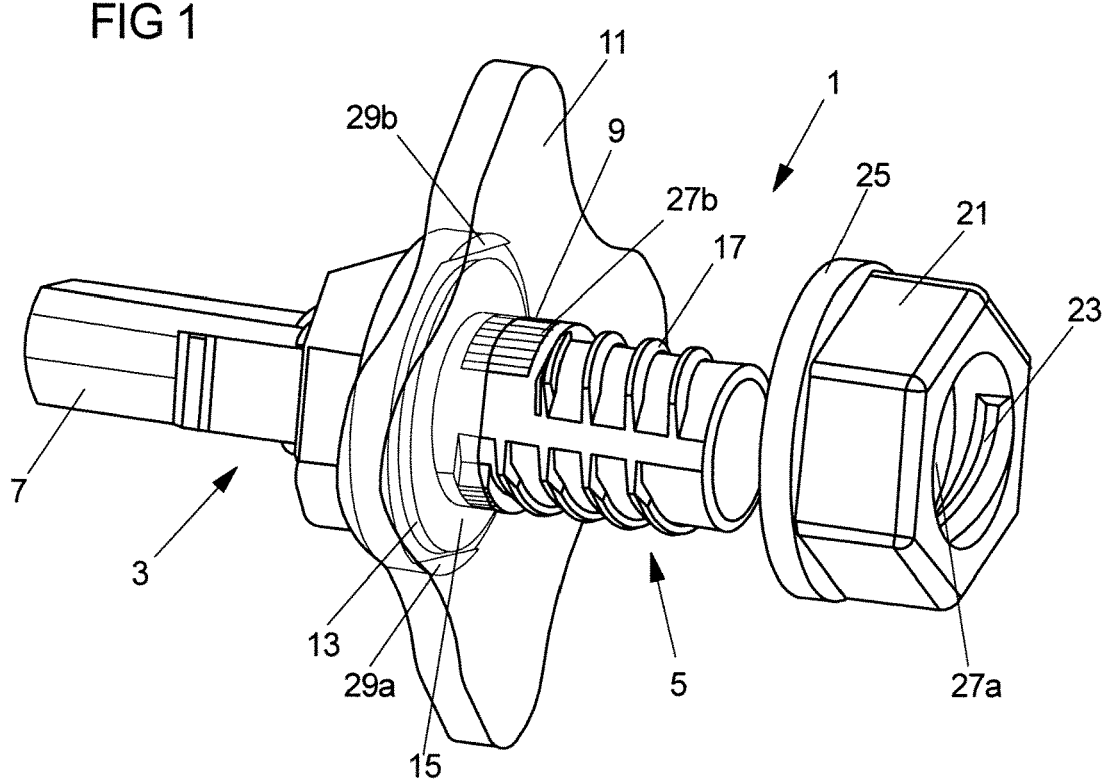
FIG. 1 is a view of a cable gland system arranged on a housing wall.

In an embodiment, the present invention provides an improved cable gland system which can be mounted simply, quickly, and reliably, and which is inexpensive to manufacture.

Accordingly, a cable gland system for arrangement in a housing wall is provided, comprising: a guide element with an opening for receiving a cable, a first support surface for supporting on a first side of the housing wall, and a first end region and an opposite second end region, wherein an external thread is arranged at least on a periphery of the first end region; and a fastening element with a second support surface for supporting on a second side of the housing wall and an internal thread on an inner surface, wherein the internal thread is adapted to engage with the external thread on the guide element when in a screwed-on state, wherein at least one contact surface with a contact structure is respectively arranged on the periphery of the guide element, adjoining the external thread, and on the inner surface of the fastening element, and wherein the contact surfaces are adapted to be in mechanical contact with one another when in the screwed-on state.

The guide element can be designed in the form of a sleeve, for insertion through an opening in a housing wall. An electrical or optical cable can be guided into or through the opening of the guide element, which is designed as a through-opening, for example. The guide element has a first support surface which, for example, is designed in the form of a disk and has a diameter that is greater than the diameter of the opening in the housing wall. However, the first support surface can also have a different geometry which is suitable for at least partially overlapping the opening in the housing wall.

Around the through-opening, at least in regions, an external thread can be arranged, preferably adjacent to the first support surface, in the direction of the first end region of the guide element. The external thread can have one thread turn or several thread turns, and can be designed to be continuous or have interruptions along the course of the thread.

The fastening element can also be referred to as a "wall fastening", and can be designed in one or more parts. In examples, the fastening element can be designed in the form of a retaining nut. The inner surface of the fastening element can be designed as a cylindrical opening which can extend through the fastening element.

A state in which the fastening element is completely screwed onto the guide element can be referred to as a "screwed-on state". The second support surface can be formed on an end face of the fastening element facing toward the guide element, for example as a flat surface with a geometry overlapping the opening in the housing wall. For example, the second support surface can be designed in the form of a disk and have a diameter that is greater than the diameter of the opening in the housing wall. In the screwed-on state, the fastening element can hereby fix the guide element in the housing wall and be in mechanical contact with the guide element and the housing wall.

In addition, at least one contact surface with a contact structure is respectively arranged on the periphery of the guide element, adjacent to the external thread and the inner surface of the fastening element, preferably in the direction of the second end region, wherein the contact surfaces are adapted to be in mechanical contact with one another in the screwed-on state. In one example, in the screwed-on state, the contact surface of the guide element can also be in mechanical contact adjacent to the external thread, in the direction of the first end region, and with a correspondingly arranged contact surface of the fastening element. The contact surfaces can be formed by a very rough surface, or else have tool-based finely drawn contours such as, for example, knurlings which are in mechanical contact with one another in the screwed-on state. In this context, the contact surfaces can also be referred to as latching surfaces and/or friction surfaces, and the contact structure can be referred to as a latching structure and/or friction structure.

Advantageously, the fastening element is hereby secured to the guide element in the screwed-on state, so that the quality of the resulting connection can be at least comparable to the quality of a connection with a fine thread on the fastening element, wherein, however, a lengthy screwing of the fastening element onto the guide element is dispensed with, and nevertheless a secure hold is ensured.

In one example, the contact surfaces have knurlings as a contact structure.

The term "knurlings" can be understood to mean a pattern of grooves or notches which run parallel to one another or intersect. In particular, "knurlings" can be formed by means of tooth peaks or tooth valleys. Advantageously, the knurlings on the periphery of the guide element and on the fastening element can mesh with one another during the screwing-on of the fastening element in such a way that an unscrewing of the fastening element is made considerably more difficult. Further advantageously, an unintentional loosening of the fastening element in the screwed-on state, for example under the action of vibrations, can be significantly hindered.

In one example, the internal thread comprises a first individual thread turn or at least partial regions of a first individual thread turn.

An individual thread turn can be understood to be a 360° circumferential, helical line with a defined pitch on the inner surface of the fastening element. Partial regions of the individual thread turn can also be referred to as "flank ribs". In one example, the internal thread comprises only the first individual thread turn.

Advantageously, the mounting time can be shortened by such a configuration of the internal thread. The production of a manufacturing tool for the cable gland system, for example a plastic tool, can also be realized more cost-effectively in comparison to a fine thread, given which a complex collapsible core is necessary in the tool.

In one example, the internal thread comprises at least two radially opposite partial regions of the first individual thread turn, separated by an interruption in the thread turn. In an alternative example, the internal thread comprises a plurality of partial regions of the first individual thread turn, which are of equal length or of different lengths, separated by interruptions in the thread turn.

Depending on the desired field of application, the number of partial regions of the thread turn and their respective length can be selected differently.

In one example, the internal thread comprises a second individual thread turn or at least partial regions of a second individual thread turn, wherein the partial regions of the first individual thread turn and of the second individual thread turn are configured identically and are arranged axially one below the other on the inner surface of the fastening element.

For example, two 360° circumferential helical lines can be arranged on the periphery. In this example, the partial regions can also be executed in duplicate, and can be arranged axially one below the other along the inner surface of the fastening element.

Advantageously, the quality of the screw connection can be further improved by the additional arrangement of a second individual thread.

In one example, the external thread and/or the internal thread are designed as a steep thread. For example, the thread pitch of the external thread falls within a range that corresponds to one-third to one-quarter of the core diameter.

Advantageously, the fastening element can be screwed to the guide element more simply and more quickly via such a steep thread pitch as compared to known thread pitches in cable gland systems.

In one example, at least one slot-shaped recess in the material of the fastening element, said recess extending parallel to the guide element in the screwed-on state, is provided in the second support surface of the fastening element.

What is known as a "breathing region" in the material of the fastening element can be achieved by means of such a slot-shaped recess. The seating of the fastening element on the guide element can hereby be advantageously further improved. For example, a portion of the fastening element having the contact surface can be widened more easily by the recess, and thus facilitate screwing-on up to a firm and secure seating. It is thus even possible to screw the fastening element on manually without a tool.

For example, the recess can surround the contact surface of the fastening element in a circular manner, at least in regions. A projecting collar can be arranged recessed in the second support surface. For example, the resulting collar can be of cylindrical design and be arranged recessed in a range of one to a few millimeters in the second support surface.

Advantageously, a collar which is recessed or rearwardly arranged in this way enables a better bracing of the threads against one another if the fastening element is screwed onto the guide element.

In one example, at least one or at least two elevation(s) is/are arranged on the first support surface in the direction of the first end region.

The elevations can be of punctiform design, or as flat surfaces which are arranged in partial regions on the first support surface. Depending on the field of application, the elevations can also be arranged peripherally in a ring shape or peripherally in regions on the first support surface, or can be arranged on the support surface in the form of a circumferential ring.

Advantageously, the elevations serve to protect against damaging compression of the first support surface or of a seal, which can in one example be arranged on the first support surface and in the mounted state be located between the first support surface and the housing wall. In one example, the cable gland system includes a seal. In addition, the elevations also serve to provide feedback to the installer, in particular in the event of a manual mounting of the cable gland. For example, if the cable gland system is not tightened with a torque wrench. For example, an abutment of the elevations on the housing wall can indicate to the installer that an installed seal is compressed sufficiently tightly to ensure its sealing function. The elevations can occupy an area of a few mm$^2$ and have a height of one or a few millimeters. In the event that no elevations are arranged on the support surface, it can only be ensured via a defined tightening torque that the installed seal is not excessively compressed. The arrangement of the at least one or at least two elevations can advantageously prevent an over-compression of the seal in the event of a manual installation.

For example, the elevations can be arranged radially opposite one another on the first support surface.

In one example, the fastening element is designed in two parts and comprises two halves. The halves are, for example, thereby adapted to be positively connectable to one another, in particular via a latching connection.

The two halves can, for example, first be pushed over a region of the external thread on the guide element and can then be moved relative to one another until the thread turn, or the partial regions of the thread turn in the two halves, come(s) into contact or engage(s) with the external thread of the guide element. Due to the positive connection, the two halves are connected to one another positively.

The fastening element can hereby be advantageously arranged even more quickly and reliably on the guide element.

In one example, intermeshing regions of the internal and external threads are roughened at least in some regions and, for example, have an average surface roughness, Rz, in a range of from 20 to 30, preferably a roughness according to VDI 3400 Cl. 36.

The specified roughness according to VDI 3400 Cl. 36 is listed in guideline VDI 3400 with publication date of June 1975.

The connection between guide element and fastening element can advantageously be further improved by a roughened embodiment of the interlocking regions of the inner and external threads and/or contact surfaces.

The second end region of the guide element can be designed as a plug-in connector part which can be plugged into a matching mating plug-in connector part. In one example, spring connection elements are arranged on the second end region of the guide element.

Advantageously, by means of an embodiment with spring connection elements, the guide element can be a first component of a plug-in connection, wherein a second component can have corresponding connecting elements in order to enable a simple plugging together of the two components.

The invention also relates to a guide element for a cable gland system, in particular for a cable gland system described herein, having: a through-opening for receiving a cable; a support surface for supporting on one side of a housing wall; and a first end region and an opposite second end region, wherein an external thread is arranged at least on a periphery of the first end region, and wherein at least one contact surface with a contact structure is arranged on the periphery of the guide element, adjacent to the external thread.

In addition, the invention relates to a fastening element for a cable gland system, in particular for a cable gland system described herein, having: a support surface for supporting on one side of a housing wall; an internal thread on an inner surface, wherein, in a screwed-on state, the internal thread is adapted to engage with an external thread on a guide element, in particular a guide element described herein, wherein at least one contact surface with a contact structure is arranged on the inner surface.

In further examples, the guide element and the fastening element can have the features described in regard to the cable gland system.

FIG. 1 shows a view of a cable gland system 1 arranged on a housing wall 11. A first end region 5 of a guide element 3 is guided through an opening 9 in the housing wall 11 and rests with a first support surface 13—or, as in the shown example, with a sealing element 15 arranged on the first support surface 13—on a side of the housing wall 11 facing toward a second end region 7 of the guide element 3.

FIG. 1 also shows an external thread 17 arranged on a periphery of the first end region 5, and an opening, which in the present instance is designed as a through-opening 19 and extends through the guide element 3.

The shown fastening element 21 is designed in the form of a screw nut and has on its outer surface a hexagonal structure for the attachment of a drive tool to the fastening element 21. In addition, the shown fastening element 21 has an internal thread 23 on an inner surface. The shown fastening element 21 can be arranged around the guide element 3 if the fastening element 21 is screwed onto the guide element 3. For this purpose, the internal thread 23 is adapted to engage with the external thread 17 on the guide element 3 in a screwed-on state. For this purpose, the shown fastening element 21 has an internal thread 23 with two radially opposite partial regions of a single thread turn, separated by an interruption in the thread turn, as will be explained in more detail with reference to the following Figures.

A respective contact surface 27a, 27b with a contact structure is arranged on the periphery of the guide element 3 in the direction of the second end region 7, adjacent to the external thread 17, and on the inner surface of the fastening element 21. If the fastening element 21 is screwed onto the guide element 3, the contact surfaces 27a, 27b are in mechanical contact with one another.

Figure 2:
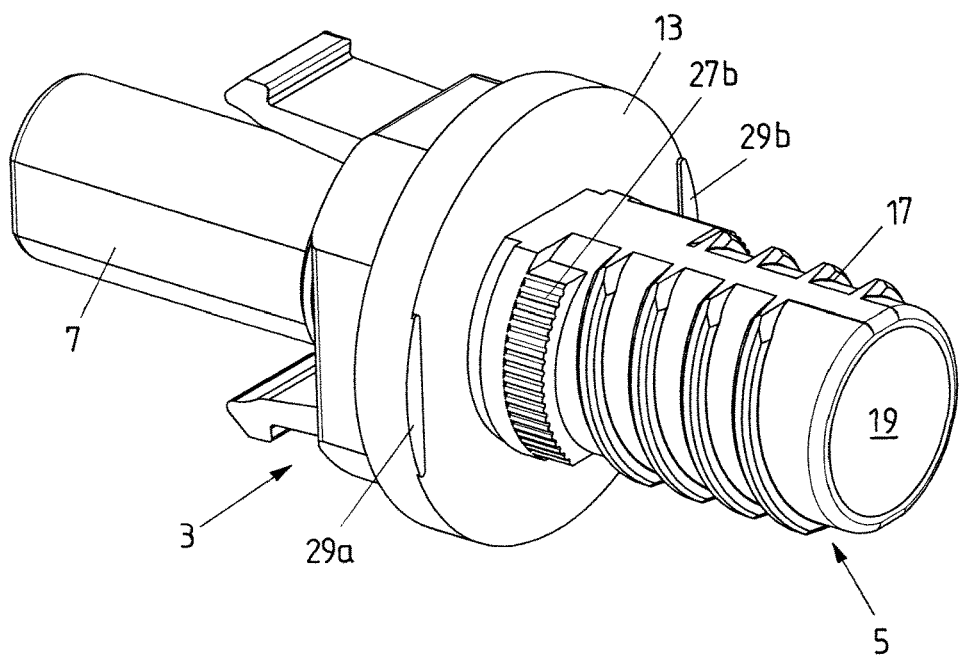
FIG. 2 is a view of a guide element.

FIG. 2 shows a view of a guide element 3. The shown guide element 3 is the guide element 3 already previously shown in FIG. 1, and is shown in FIG. 2 with no further components arranged thereon. The external thread 17 on the shown guide element 3 has a plurality of thread turns which are designed with interruptions along the course of the thread.

A contact surface 27b with a contact structure is arranged on the periphery of the guide element 3 in the direction of the second end region 7, between the external thread 17 and the first support surface 13 of the guide element 3. The contact surface 27b shown in FIG. 2 has knurlings oriented parallel to one another as a contact structure. The knurlings on the periphery of the guide element 3 and the knurlings on the fastening element can mesh with one another during the screwing-on of the fastening element in such a way that unscrewing the fastening element is considerably hindered. Further advantageously, a loosening of the fastening element in the screwed-on state, for example due to the possible action of vibrations, can thus hereby be considerably hindered. In the shown example, the guide element 3 specifically comprises two opposite contact surfaces 27a which extend to different extents in the axial direction (from the first end region to the second end region).

Some or all surfaces of the shown external thread 17 (in particular of the thread flanks) and/or of the first support surface 13 can have an average surface roughness, Rz, in a range of from 20 to 30, preferably a roughness according to VDI 3400 Cl. 36. Likewise, surfaces of the fastening element 21, in particular of the internal thread 23 (for example of the thread flanks) and/or of the second support surface 25 can have an average surface roughness, Rz, in a range of from 20 to 30, preferably a roughness according to VDI 3400 Cl. 36. Alternatively or in addition to the knurlings, the contact surfaces 27a, 27b of the guide element 3 and/or of the fastening element can also have peak-to-valley heights and roughnesses of this kind.

In addition, the substantially flat first support surface 13 is shown in FIG. 2. In FIG. 2, the first support surface 13 is shown with a circular shape, but can also have a different geometry, as long as the geometry is suitable for covering the opening in the housing wall at least in regions.

On the edges of the first support surface 13, in the direction of the first end region 5, two elevations 29a, 29b are arranged radially opposite each other on the first support surface 13. The elevations 29a, 29b can occupy an area of a few mm² and have a height of one or a few millimeters. A sealing element (see, for example, FIG. 1) can be arranged on the first support surface 13, wherein the edges of the sealing element do not cover the elevations 29a, 29b. The shown elevations 29a, 29b serve to protect the first support surface 13, or a seal arranged thereon, from damaging compression during the mounting of the cable gland system. As an alternative or in addition to the shown embodiment, more than two elevations can also be arranged on the support surface 13. In an alternative embodiment, it is also possible that no elevations are arranged on the support surface 13. In this alternative embodiment, it is usually ensured with a defined torque that an installed sealing element is not damaged by over-compression.

Figure 3C:
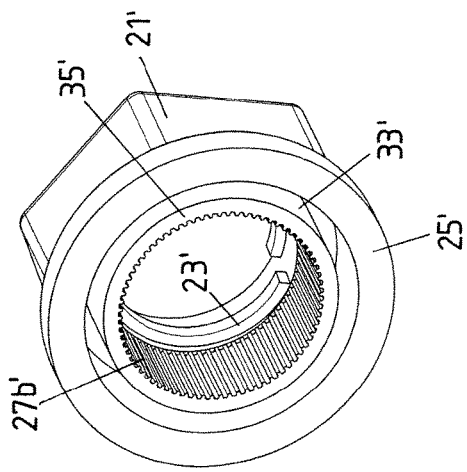
FIGS. 3A, 3B, 3C are views of a fastening element according to a first embodiment.
Figure 4C:
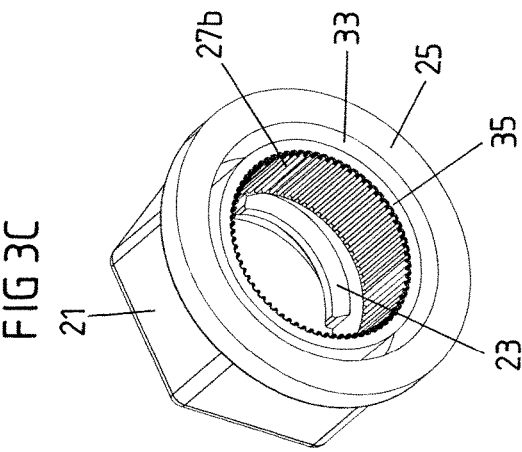
FIGS. 4A, 4B, 4C are views of a fastening element according to a second embodiment.
Figure 3B:
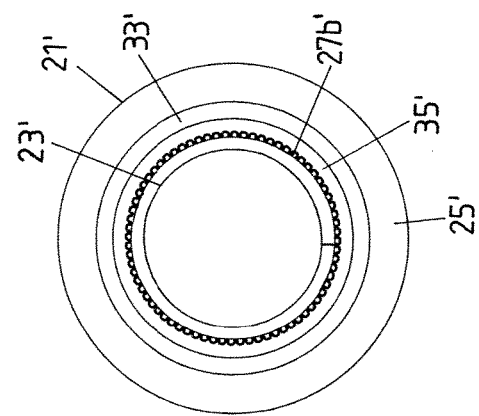
Figure 4B:
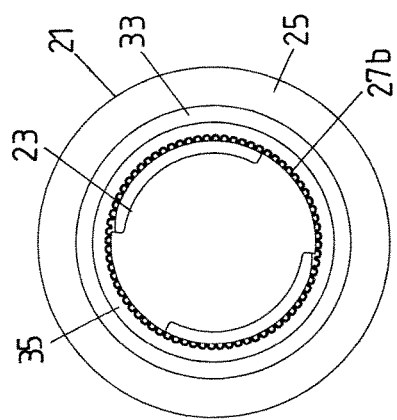
Figure 3A:
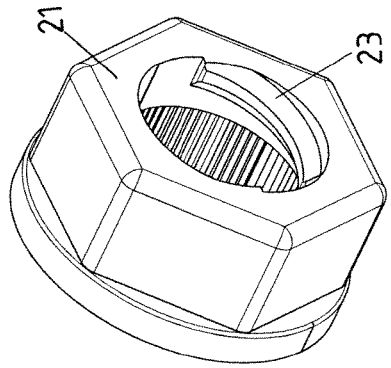
Figure 4A:
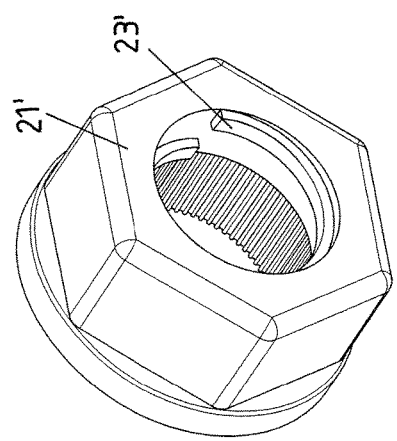
Figure 5C:
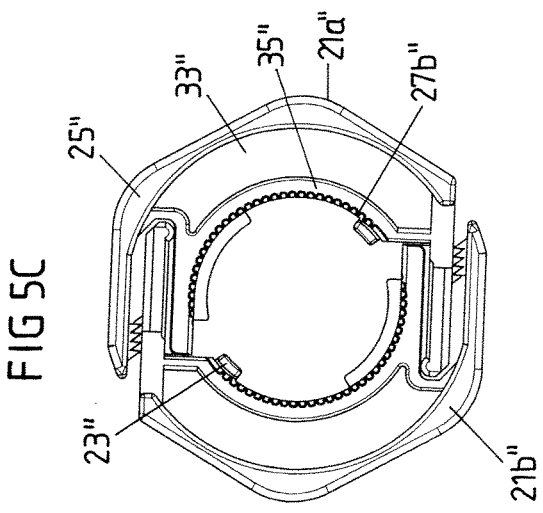
FIGS. 5A, 5B, 5C are views of a fastening element according to a third embodiment.
Figure 5B:
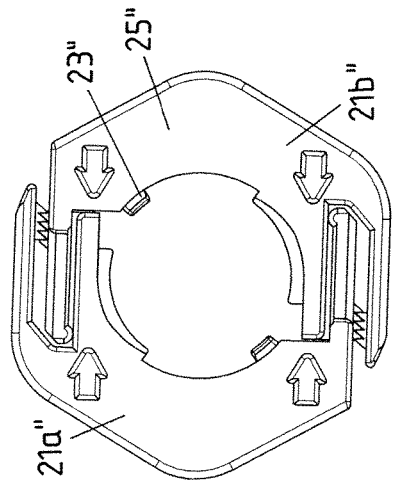
Figure 5A:
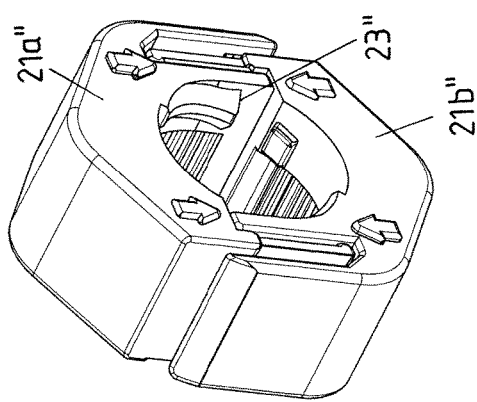

FIGS. 3A, 4A, and 5A show isometric views, FIGS. 3B, 4B, and 5B show plan views, and FIGS. 3C, 4C, and 5C show further views of embodiments of fasteners 21, 21†, 21††, 21b††.

FIGS. 3A, 3B, and 3C show views of a fastening element 21 according to a first embodiment. The shown fastening element 21 represents the fastening element 21 already shown in FIG. 1. In the shown embodiment, the internal thread 23 is formed from two radially opposite partial regions.

FIGS. 4A, 4B, and 4C show views of a fastening element 21† according to a second embodiment. The shown embodiment differs from the embodiment shown in FIGS. 3A, 3B, and 3C, in that the internal thread 23† has a single thread turn which extends once around 360° on the inner surface of the fastening element 21†.

FIGS. 5A, 5B, and 5C show views of a fastening element 21a††, 21b†† according to a third embodiment. The fastening element 21a††, 21b†† shown in FIGS. 5A, 5B, and 5C is designed in two parts and comprises two halves, wherein the two halves can be positively connected to one another via the shown latching connection. The internal thread 23†† comprises a plurality of, presently four, partial regions of a single thread turn, wherein two respective partial regions are presently arranged on each half. In embodiments, the two halves can also have partial regions of the same length or of different lengths, depending on the intended use.

Figure 6:
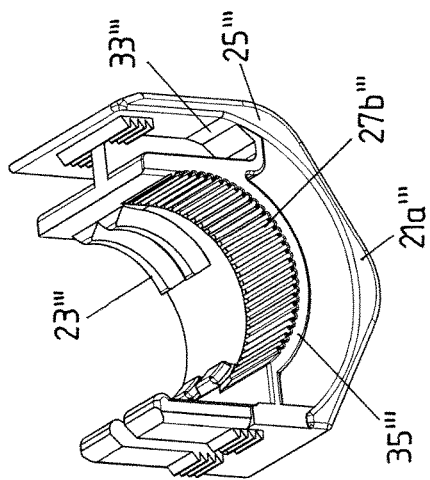
FIG. 6 is a view of one half of a two-part fastening element according to a fourth embodiment.

FIG. 6 shows a view of one half of a two-part fastening element 21a††† according to a fourth embodiment.

The half shown in FIG. 6 differs from the embodiment previously shown in FIGS. 5A, 5B, and 5C in that the internal thread 23††† comprises partial regions of a second individual thread turn, wherein the shown partial regions of the first individual thread turn and of the second individual thread turn are of identical design and are arranged axially one below one another on the inner surface of the fastening element.

Figure 7:
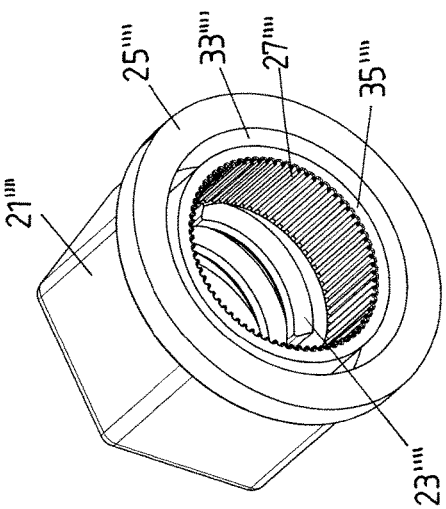
FIG. 7 is a view of a fastening element according to a fifth embodiment.

FIG. 7 shows a view of a fastening element 21†††† according to a fifth embodiment. The fastening element 21†††† shown in FIG. 7 is designed in one piece and, like the fastening element 21†† already shown in FIG. 6, has an internal thread 23†††† with a first individual thread turn and a second individual thread turn.

FIGS. 3A to 7 also show the recess 33, 33†, 33††, 33†††, 33††††; a circumferential collar 35, 35†, 35††, 35†††, 35†††† which is arranged recessed in the second support surface 25, 25†, 25††, 25†††, 25†††† in each of the shown embodiments; and the contact surfaces 27b, 27b†, 27b††, 27b†††, 27b†††† arranged on the inner surface of the fastening element 21, 21†, 21††, 21a†††, 21b††, 21††††.

Figure 8:
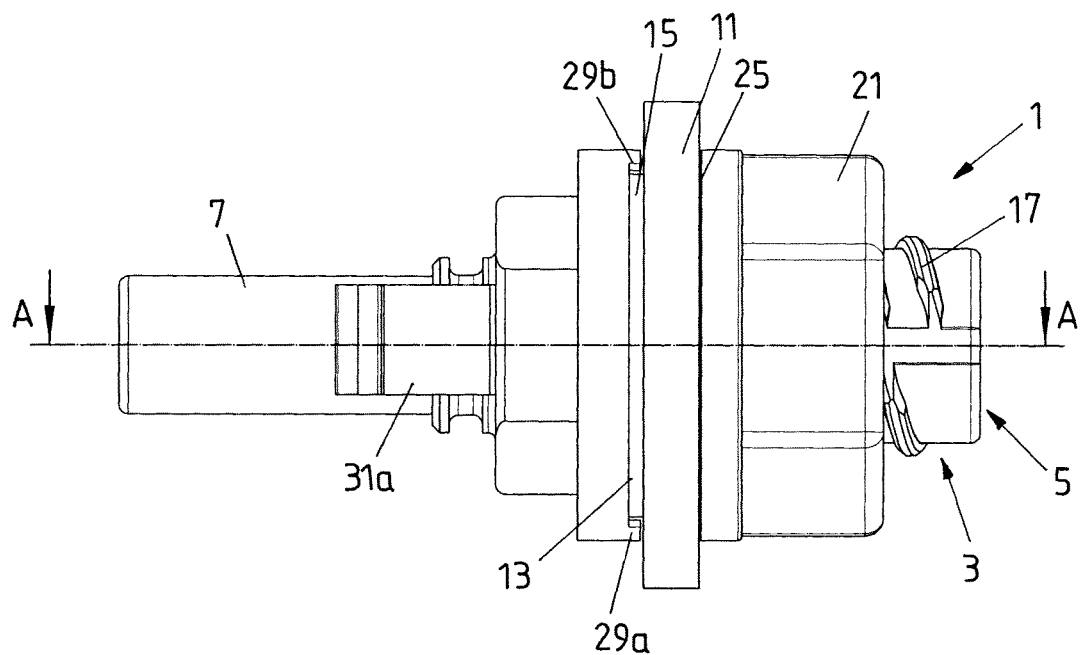
FIG. 8 is a side view of a cable gland system with the guide element and the fastening element in a screwed-on state.
Figure 9:
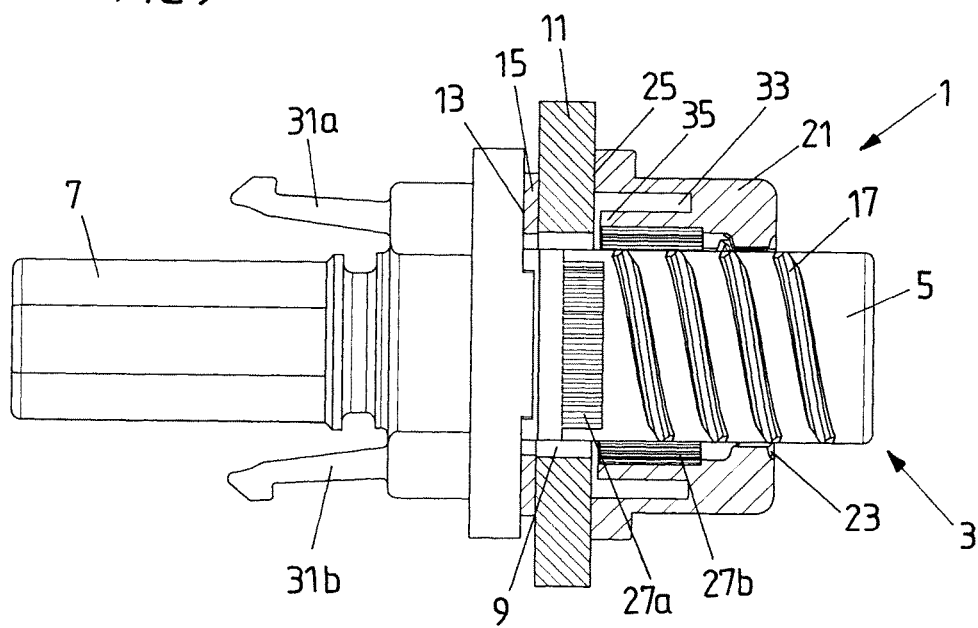
FIG. 9 is a sectional view through the cable gland system shown in FIG. 8.

FIG. 8 shows a side view of a cable gland system 1 with the guide element 3 and the fastening element 21, in a screwed-on state. FIG. 9 shows a partially cut-away sectional view through the cable gland system 1 shown in FIG. 8, along the indicated line A-A.

The shown cable gland 1 is arranged on a housing wall 11. The first end region 5 of the guide element 3 is guided through an opening 9 in the housing wall 11 and rests, with a sealing element 15 arranged on the first support surface 13, on a side of the housing wall 11 facing toward the second end region 7 of the guide element 3.

In FIGS. 8 and 8, the fastening element 21 is screwed completely onto the guide element 3. In the screwed-on state, the fastening element 21 hereby fixes the guide element 3 in the housing wall 11.

In FIG. 9, it is shown that the internal thread 23 on the inner surface of the fastening element 21 is screwed onto the external thread 17 of the guide element 3.

In addition, it is also shown that, in the screwed-on state of the fastening element 21 on the guide element 3, the contact surfaces 27a, 27b are in mechanical contact with one another. The contact surface 27b of the fastening element 21 is (axially) at a distance from the inner thread 23 of the fastening element 21.

In the shown embodiment, a slot-shaped recess 33 extending parallel to the guide element 3 is arranged in the fastening element 21 in the material of said fastening element 21. The recess 33 extends in a circular manner around the contact surface 27b of the fastening element 21, and the formed collar 35 is arranged recessed in the second support surface 25.

In addition, in the shown embodiment, spring connection elements 31a, 31b are arranged on the second end region 7 of the guide element 3. With the spring connection elements 31a, 31b, the guide element 3 can be used as a first component of a plug-in connection, wherein a second component can have corresponding connecting elements in order to enable simple plugging together of the two components.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Cable gland system
3 Guide element
5 First end region
7 Second end region
9 Opening
11 Housing wall
13 First support surface
15 Sealing element
17 External thread
19 Through-opening
21, 21†, 21a††, 21a†††, 21b††, 21†††† Fastening element
23, 23†, 23††, 23†††, 23†††† Internal thread
25, 25†, 25††, 25†††, 25†††† Second support surface
27a, 27b, 27b', 27b††, 27b†††, 27b†††† Contact surface
29a, 29b Elevations
31a, 31b Spring connection elements
33, 33†, 33††, 33†††, 33†††† Recess
35, 35†, 35††, 35†††, 35†††† Collar

The invention claimed is:

1. A cable gland system for arrangement on a housing wall, comprising:
   a guide element with an opening configured to receive a cable, a first support surface configured to support on a first side of the housing wall and a first end region, and an opposite second end region, at least one external thread being arranged at least on a periphery of the first end region; and
   a fastening element with a second support surface configured to support on a second side of the housing wall, and an internal thread on an inner surface, the internal thread being configured to engage with the external thread on the guide element in a screwed-on state,
   wherein at least one contact surface with a contact structure is respectively arranged on the periphery of the guide element, adjacent to the external thread, and on the inner surface of the fastening element,
   wherein the contact surfaces are configured to be in mechanical contact with one another in the screwed-on state,
   wherein the contact surfaces have knurlings as a contact structure, and
   wherein the knurlings comprise a pattern of grooves that run parallel to one another.

2. The cable gland system of claim 1, wherein the internal thread comprises a first individual thread turn or at least partial regions of a first individual thread turn.

3. The cable gland system of claim 2, wherein the internal thread comprises at least two radially opposite partial regions of the first individual thread turn, separated by an interruption in the first individual thread turn.

4. The cable gland system of claim 2, wherein the internal thread comprises a plurality of partial regions of the first thread turn which are of equal length or of different lengths, separated by interruptions in the first thread turn.

5. The cable gland system of claim 2, wherein the internal thread comprises a second individual thread turn or at least partial regions of a second individual thread turn, and
   wherein the partial regions of the first individual thread turn and of the second individual thread turn are of identical design and are arranged axially, one below another, on the inner surface of the fastening element.

6. The cable gland system of claim 1, wherein the external thread and the internal thread respectively comprise a steep thread.

7. The cable gland system of claim 1, wherein, in the second support surface of the fastening element, at least one slot-shaped recess extending parallel to the guide element in the screwed-on state is provided in a material of the fastening element.

8. The cable gland system of claim 7, wherein the recess, at least in regions, runs circularly around the contact surface of the fastening element, and a projecting collar is arranged recessed in the second support surface.

9. The cable gland system of claim 1, wherein at least two elevations are arranged on the first support surface in a direction of the first end region.

10. The cable gland system of claim 9, wherein the at least two elevations are arranged radially opposite one another on the first support surface.

11. The cable gland system of claim 1, wherein the fastening element comprises two halves, and
wherein the two halves are each configured to be positively connected to one another via a latching connection.

12. The cable gland system of claim 1, wherein intermeshing regions of the internal thread and external thread have a roughened design, at least in regions, and have an average surface roughness in a range of 20 to 30.

13. The cable gland system of claim 1, wherein spring connection elements are arranged on the second end region of the guide element.

14. A guide element for the cable gland system of claim 1, comprising:
the opening configured to receive the cable;
the support surface configured to support on one side of the housing wall; and
the first end region and the opposite second end region, the external thread being arranged at least on the periphery of the first end region,
wherein the at least one contact surface with the contact structure is arranged on the periphery of the guide element, adjacent to the external thread.

15. A fastening element for a cable gland system, comprising:
a support surface configured to support on one side of a housing wall; and
an internal thread on an inner surface, the internal thread being configured to engage with an external thread on the guide element of claim 14 in a screwed-on state,
wherein the at least one contact surface with the contact structure is arranged on the inner surface.

16. The cable gland system of claim 12, wherein the average surface roughness is according to VDI 3400 Cl. 36.

* * * * *